US 8,272,422 B2

(12) United States Patent
Gaines et al.

(10) Patent No.: US 8,272,422 B2
(45) Date of Patent: Sep. 25, 2012

(54) FILM LOADING ARRANGEMENT FOR LAMINATOR

(75) Inventors: Ervin Gaines, Crown Point, IN (US); Michael J. Ksiazek, Burr Ridge, IL (US); Roger Hamblen, North York (CA); Shih-Huang Lee, Taipei (TW)

(73) Assignee: General Binding Corporation, Northbrook, IL (US)

( * ) Notice: Subject to any disclaimer, the term of this patent is extended or adjusted under 35 U.S.C. 154(b) by 1555 days.

(21) Appl. No.: 11/462,456

(22) Filed: Aug. 4, 2006

(65) Prior Publication Data
US 2007/0029436 A1 Feb. 8, 2007

Related U.S. Application Data

(60) Provisional application No. 60/705,896, filed on Aug. 5, 2005.

(51) Int. Cl.
- B29C 65/02 (2006.01)
- B32B 37/00 (2006.01)
- B32B 39/00 (2006.01)
- B30B 15/34 (2006.01)

(52) U.S. Cl. .................. 156/580; 156/583.1; 242/599.3
(58) Field of Classification Search .................. 156/580, 156/583.1; 242/599.3
See application file for complete search history.

(56) References Cited

U.S. PATENT DOCUMENTS

| | | |
|---|---|---|
| 871,791 A | 11/1907 | Fidler |
| 1,466,157 A | 8/1923 | Byrne et al. |
| 1,531,002 A | 3/1925 | Grondahl |
| 1,615,149 A | 1/1927 | Trebes |
| 1,709,506 A | 4/1929 | Wallace et al. |
| 1,817,217 A | 8/1931 | Victor |
| 1,967,676 A | 7/1934 | Marchev |
| 2,035,158 A | 3/1936 | Henkels |
| 2,051,212 A | 8/1936 | Hallett et al. |
| 2,250,560 A | 7/1941 | Winslow |

(Continued)

FOREIGN PATENT DOCUMENTS
DE 3145405 A1 5/1983
(Continued)

OTHER PUBLICATIONS

Attalam 370R Roll Laminator, website, available at least as early as Nov. 19, 2004, 1 page.

(Continued)

*Primary Examiner* — Sing P Chan
(74) *Attorney, Agent, or Firm* — Michael Best & Friedrich LLP

(57) ABSTRACT

A film loading arrangement simplifies the film loading process for a user and prevents the improper loading of a laminate film roll into a laminator. The components allow the laminate roll of film to be loaded in the correct orientation by providing differing connection structures on each end of the laminate film roll. The differing connection structures are received by respective receiving structures on the laminator. Each connection structure is compatible with only one of the receiving structures such that when the connection structures are attached to the roll, the film can be loaded in only one direction, i.e., correctly. Therefore, the user can properly load a laminate film roll and avoid damaging the laminator as a result of improper film loading. A tensioning mechanism can be provided for adjusting the force required to unroll laminating film from the supported roll.

18 Claims, 8 Drawing Sheets

U.S. PATENT DOCUMENTS

| | | | |
|---|---|---|---|
| 2,414,893 A | | 1/1947 | Peterson |
| 2,662,702 A | | 12/1953 | Bruestle |
| 2,954,182 A | | 9/1960 | Bojanower |
| 3,076,616 A | | 2/1963 | Wenrich |
| 3,211,395 A | | 10/1965 | Slijkhuis |
| 3,499,611 A | | 3/1970 | Franck |
| 3,975,146 A | | 8/1976 | Saupe |
| 4,089,551 A | * | 5/1978 | Perreira ............ 292/260 |
| 4,176,805 A | | 12/1979 | Jackson |
| 4,304,369 A | | 12/1981 | Landsness |
| 4,416,719 A | | 11/1983 | Horiuchi |
| 4,462,854 A | | 7/1984 | Wenstrom et al. |
| 4,834,830 A | | 5/1989 | Heeler et al. |
| 4,936,079 A | | 6/1990 | Skalsky et al. |
| 5,029,766 A | | 7/1991 | Emming |
| 5,071,504 A | | 12/1991 | Singer |
| 5,149,393 A | | 9/1992 | Hutchinson et al. |
| 5,228,656 A | | 7/1993 | Sauber |
| 5,320,699 A | | 6/1994 | Clark, Jr. et al. |
| 5,356,507 A | | 10/1994 | Wojtanowitsch et al. |
| 5,415,363 A | | 5/1995 | Travis et al. |
| 5,584,962 A | | 12/1996 | Bradshaw et al. |
| 5,591,364 A | * | 1/1997 | Suppelsa et al. ............ 219/201 |
| 5,601,685 A | | 2/1997 | Morse et al. |
| 5,609,714 A | | 3/1997 | Whiteside et al. |
| 5,746,878 A | | 5/1998 | Kuhns et al. |
| 5,873,965 A | | 2/1999 | Greller |
| 6,056,234 A | | 5/2000 | Kim |
| 6,056,332 A | * | 5/2000 | Foster ............ 285/367 |
| 6,159,327 A | | 12/2000 | Forkert |
| 6,425,548 B2 | | 7/2002 | Christensen et al. |
| 6,491,080 B2 | | 12/2002 | Tasma |
| 6,527,896 B1 | | 3/2003 | Sawano |
| 6,675,855 B1 | | 1/2004 | Lemens |
| 6,843,296 B2 | | 1/2005 | Lemens et al. |
| 6,883,573 B2 | | 4/2005 | Saski et al. |
| 2002/0033235 A1 | | 3/2002 | Maes |
| 2002/0059980 A1 | | 5/2002 | Lemens et al. |
| 2002/0117266 A1 | | 8/2002 | Han |
| 2004/0040669 A1 | | 3/2004 | Lin |
| 2004/0045677 A1 | | 3/2004 | Lemens et al. |
| 2004/0045678 A1 | | 3/2004 | Lemens et al. |
| 2004/0050488 A1 | | 3/2004 | Lemens et al. |
| 2004/0050500 A1 | | 3/2004 | Lemens et al. |
| 2004/0050501 A1 | | 3/2004 | Lemens et al. |
| 2005/0039859 A1 | | 2/2005 | Sugaya et al. |
| 2005/0081978 A1 | | 4/2005 | Britz |
| 2005/0098267 A1 | | 5/2005 | Hoffman et al. |
| 2006/0108072 A1 | | 5/2006 | Kim |

FOREIGN PATENT DOCUMENTS

| | | |
|---|---|---|
| EP | 0079436 B1 | 5/1983 |
| JP | 11322141 | 11/1999 |
| WO | WO 94/15789 | 7/1994 |

OTHER PUBLICATIONS

Banner American Easy-Lam II Roll Laminator Roll Laminators—27 to 31 inch Roll Laminators, website, available at least as early as Nov. 19, 2004, 1 page.

Banner American Easy-Lam Roll Laminator Roll Laminators—27 to 31 inch Roll Laminators, website, available at least as early as Nov. 19, 2004, 1 page.

Banner American MightyLam 2700 Roll Laminator Roll Laminators—27 to 31 inch Roll Laminators, website, available at least as early as Nov. 19, 2004, 1 page.

HOP TCC SM-2700 Roll Laminators—27 to 31 inch Roll Laminators, website, available at least as early as Nov. 19, 2004, 1 page.

Ledco Educator Roll Laminators—18 to 26 inch Roll Laminators, website, available at least as early as Nov. 19, 2004, 2 pages.

Ledco Premier 4 Roll Laminators—18 to 26 inch Roll Laminators, website, available at least as early as Nov. 19, 2004, 1 page.

Roll Laminators—18 to 26 inch, website, available at least as early as Nov. 19, 2004, 3 pages.

Roll Laminators—27 to 31 inch, website, available at least as early as Nov. 19, 2004, 2 pages.

Royal Sovereign RSL-2701, School Roll Laminator, website, available at least as early as Nov. 19, 2004, 1 page.

USI ARL 27in Roll Laminators—27 to 31 inch Roll Laminators, website, available at least as early as Nov. 19, 2004, 1 page.

USI Clear Tek 2700 Roll Laminators—27 to 31 inch Roll Laminators, website, available at least as early as Nov. 19, 2004, 1 page.

USI CSL 2700 Roll Laminators—27 to 31 inch Roll Laminators, website, available at least as early as Nov. 19, 2004, 1 page.

International Search Report and Written Opinion for corresponding International Application No. PCT/US2006/030541 mailed on Dec. 20, 2006.

* cited by examiner

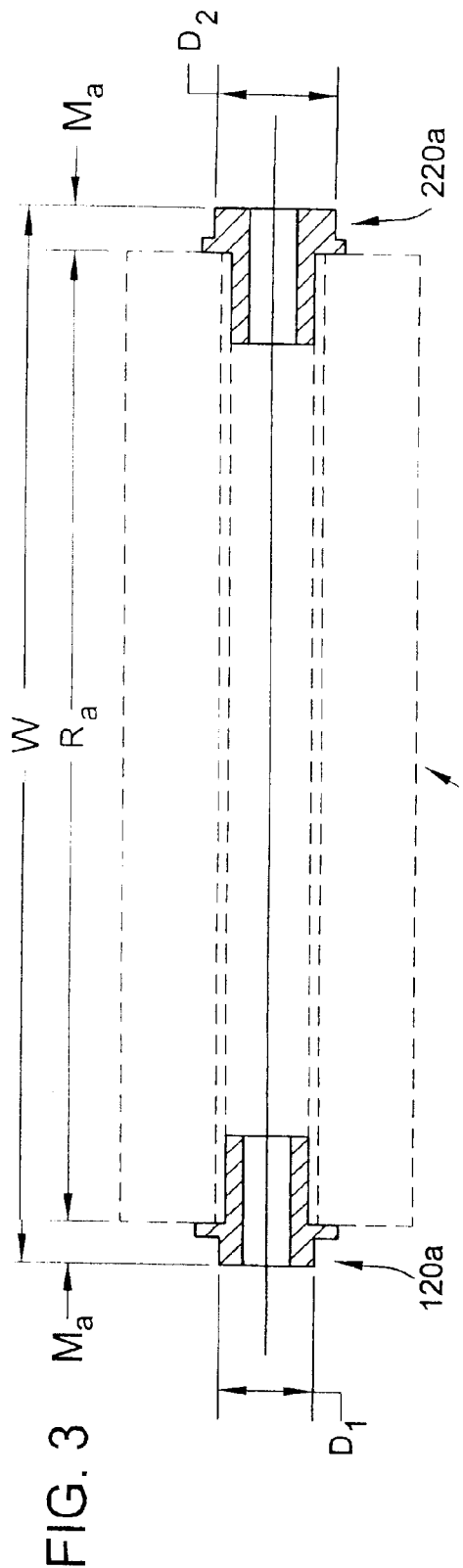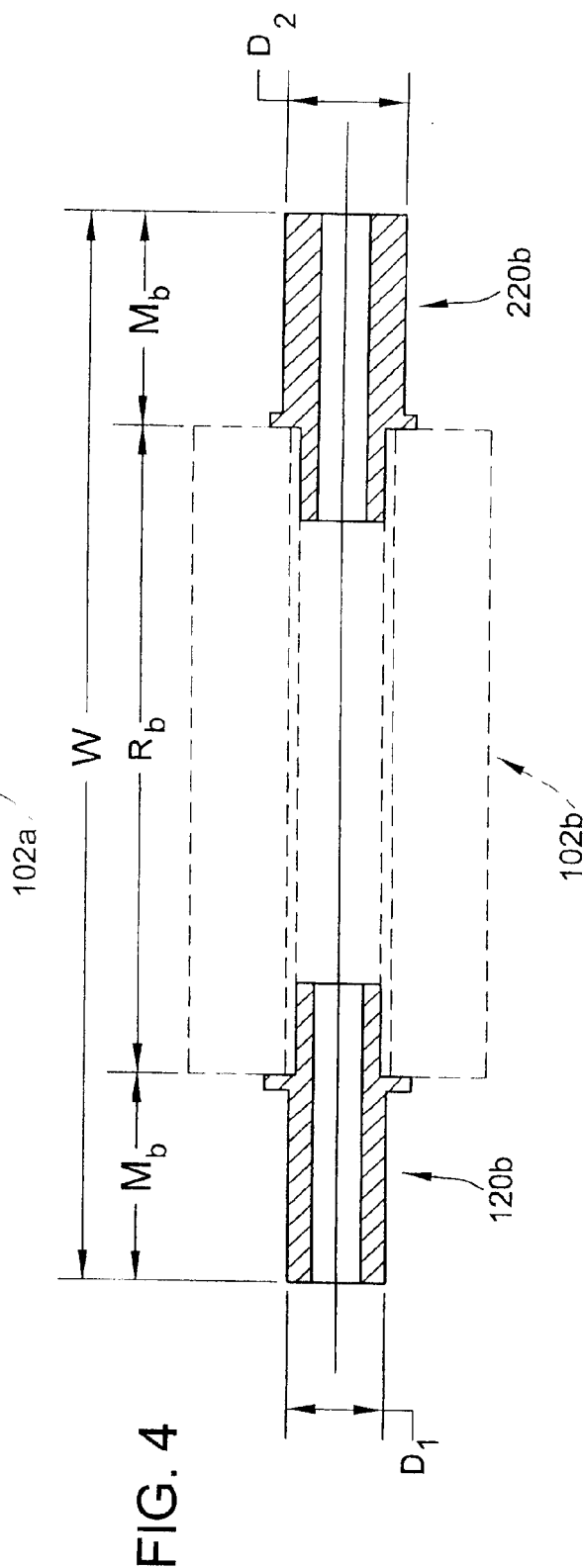

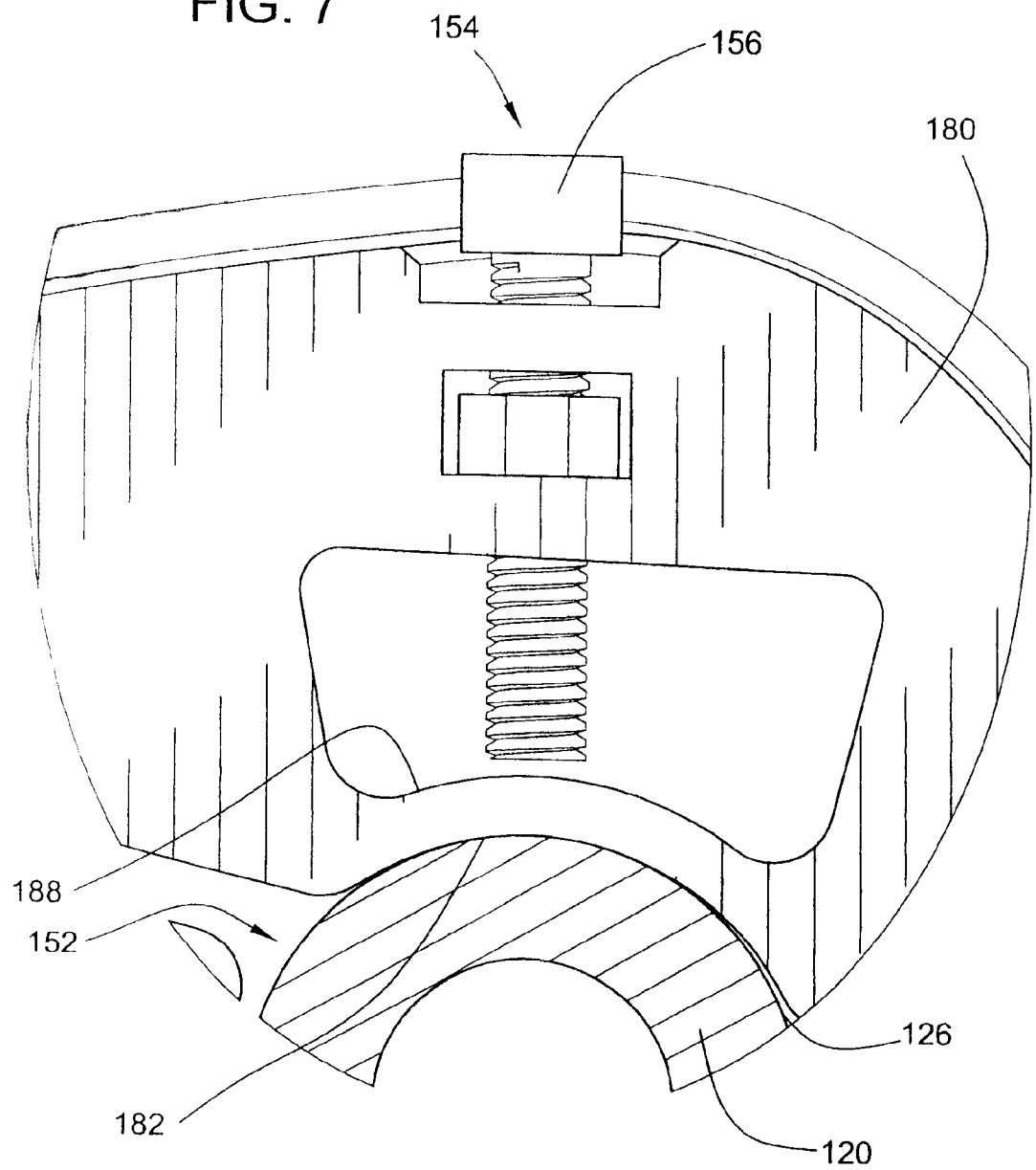

FILM LOADING ARRANGEMENT FOR LAMINATOR

RELATED APPLICATIONS

This application claims priority to U.S. Provisional Patent Application No. 60/705,896 filed Aug. 5, 2005, the entire content of which is hereby incorporated by reference.

FIELD OF THE INVENTION

The invention relates to table top laminators, and, more particularly to an arrangement for ensuring proper and easy loading of rolls of laminating film for use in such laminators, and an arrangement for tensioning such rolls as they are fed into the laminator.

BACKGROUND OF THE INVENTION

Laminating machines (or laminators) are used to apply a laminate film to a sheet material, such as paper. The film coats the upper and/or lower surfaces of the sheet material, and, thus, protects the sheet material by shielding the sheet material from external elements. Some laminators use discrete pre-cut films of a particular size to laminate a sheet material. Alternately, the film used in other laminators is supplied on a roll that is unwound as the film is fed into the laminator and cut to the appropriate size after the sheet has been laminated. With these roll-type laminators, a significant amount of film may be supplied before the user needs to reload the film. Typically, two rolls are utilized by the laminator to provide an upper film and a lower film for disposal on an upper surface and lower surface of the sheet material, respectively. In this way, the sheet material is completely enclosed and protected by the films.

The laminate film typically comprises a substrate and an adhesive layer, which is disposed on one side of the substrate. The adhesive may be a pressure sensitive adhesive or a thermal adhesive. In the case of pressure sensitive adhesives, the sheet material and film are fed into the laminator and a compression force is applied to the sheet material and film combination to activate the adhesive and adhere the film to the sheet material. Usually, this force is applied by a roller or similar suitable structure. In the case of films having a thermal adhesive, heat is applied to the film to activate the adhesive and adhere the film to the sheet material. Often, the heat is supplied through a heating roller that may also apply a compression force on the film and sheet material combination.

Considering that the adhesive is disposed on only one side of the film, it is essential that the film be loaded correctly into the laminator, i.e., such that as the film is fed into the laminator, the adhesive is disposed between the substrate and the sheet material. If the film is loaded incorrectly, the adhesive will not be disposed adjacent to the sheet material, and, thus, the film will not adhere to the sheet material. Furthermore, loading the film incorrectly may cause significant damage to the interior of the machine because the adhesive may adhere to components such as the roller. Such damage may necessitate costly and/or time consuming repairs and cleaning of the laminator.

In current laminators, it is difficult for users to determine how the film should be loaded because the rolls of film may physically be loaded in either direction, the machines lack adequate instruction to assist the user, or the user fails to follow provided instructions for loading the film. Thus, it is common for users to incorrectly load the rolls of film and damage the laminator. Furthermore, when using laminators having films to laminate both the upper surface and the lower surface of a sheet material, it can be difficult to mount the upper roll and the lower roll such that they are properly aligned with the sheet material and each other.

BRIEF SUMMARY OF THE INVENTION

The invention provides a film loading arrangement that simplifies the film loading process for a user and prevents the improper loading of a laminate film roll into a laminator. The invention provides components that allow the laminate roll of film to be loaded in the correct orientation by providing differing connection structures on each end of the laminate film roll. The differing connection structures are received by respective receiving structures on the laminator. Each connection structure is compatible with only one of the receiving structures such that when the connection structures are attached to the roll, the film can be loaded in only one direction, i.e., correctly. Therefore, the user can properly load a laminate film roll and avoid damaging the laminator as a result of improper film loading.

In one embodiment, the invention provides a laminate film roll including rolled laminate film, a first end having a first configuration, and a second end having a second configuration different from the first configuration to facilitate loading of the laminate film roll in a proper orientation in a laminating machine.

In another embodiment, the invention provides a laminating machine configured to support a roll of laminate film having first and second ends. The laminating machine includes a first support unit configured to receive only the first end of the laminate film roll to properly position the roll in the laminating machine, and a second support unit configured to receive only the second end of the laminate film roll to properly position the roll in the laminating machine.

In one embodiment of the invention, the film loading apparatus comprises a first male coupling structure, a second male coupling structure, a first female support unit, and a second female support unit. The first and second male coupling structures may be coupled to respective ends of the laminate film roll, and comprise protruding support portions of different diameters particular to the direction in which the film is wound. The first and second female support units are attached to opposing interior surfaces of the laminator, and each comprise a seat for receiving support portions of the first and second male coupling structures, respectively. The first and second female support units may further comprise respective roll securing structures that lock into place to secure the laminate film roll to the laminator. When loading the film roll into the laminating machine, the first and second male coupling structures cooperate with the first and second support portions, respectively, such that the roll securing structures may be locked into place with the film roll loaded in only the proper direction.

Furthermore, the invention provides a friction force adjustment mechanism that permits the adjustment of the amount of friction force that is applied to the roll of film when it is mounted in the laminator. Thus, the friction force adjustment mechanism controls the amount of force needed to unwind the roll of film and provides for a relatively consistent tension between the laminator and the roll. The friction force adjustment mechanism prevents undesired over-rolling of the film roll during the laminating process and enables the film to be fed into the laminator at a relatively controlled rate.

In an embodiment of the invention, at least one of the first and second female support units for each roll loaded in the laminator comprises the friction force adjustment mechanism. The friction force adjustment mechanism comprises a screw that extends through a portion of the female support unit to contact a deformable portion of the female support unit. The deformable portion is disposed against the male coupling structure of the roll. When the screw is rotated, it may apply a force on the deformable portion that ultimately causes the deformable portion to press against the coupling structure thereby increasing the frictional force that must be overcome to rotate the roll of film.

BRIEF DESCRIPTION OF THE DRAWINGS

FIG. 3 is a cross-sectional view of male coupling inserts for the film loading arrangement shown in FIG. 1, the roll of laminating film being shown in phantom;

FIG. 4 is another cross-sectional view of an alternate embodiment of male coupling inserts for the film loading arrangement shown in FIG. 1, the roll of laminating film being shown in phantom;

FIG. 7 is an enlarged fragmentary cross-sectional view of the laminating machine and film loading arrangement shown in FIG. 1;

FIG. 8b is a top view of the upper securing structure of FIG. 8a;

FIG. 9b is a bottom view of the lower support structure of FIG. 9a; and

DETAILED DESCRIPTION OF THE INVENTION

Figure 1:
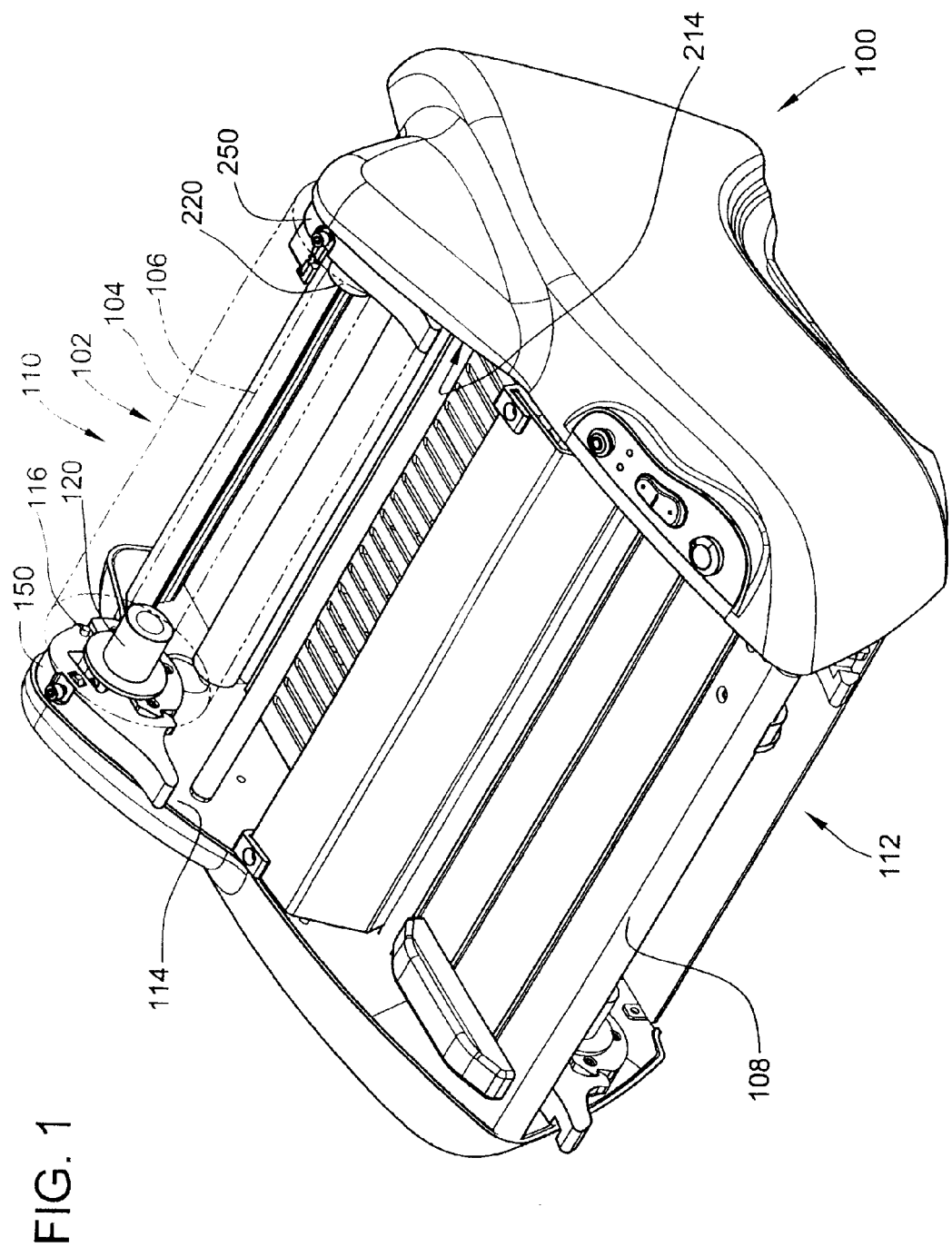
FIG. 1 is a perspective view of a laminating machine with a film loading arrangement in accordance with teachings of the invention.

Turning to the drawings, a laminating machine (or laminator) 100 is shown in FIG. 1. The laminator 100 is used to adhere a laminate film 104 to a sheet material, such as paper. In a laminator 100 of the type illustrated, the laminate film 104 is supplied to the laminator 100 from one or more laminate film rolls 102, the laminate film 104 itself being wound around a tube 106. The laminator 100 receives the sheet material (not shown) near the front 108 of the laminator 100. The sheet material is fed into the laminator and combined with one or more laminate films 104 to provide a protective coating to an upper and/or lower surface of the sheet material. The combined sheet material and laminate film(s) 104 typically proceed between a first roller and a flat surface or a second roller (not shown) to activate the lamination. While the actual lamination process itself is not shown in the drawings, the lamination process is well known to those of skill in the art.

The upper laminate film may be supplied from a laminate roll 102 disposed in an upper laminate film mounting area 110 of the laminator 100, while the lower laminate film (not shown) may be supplied from a laminate roll disposed in a lower laminate film mounting area 112. As the laminate film 104 is pulled into the laminator 100 to laminate a sheet material the laminate film 104 is unwound from the roll 102, forcing the roll 102 to rotate.

The laminate film roll 102 is mounted to the laminator 100 in the upper and/or lower film mounting area(s) 110, 112 via a film loading arrangement. In accordance with an aspect of the invention, the film loading arrangement permits the laminate film roll 102 to be loaded in only one position or orientation, i.e., the arrangement prevents the laminate film roll 102 from being loaded improperly. In accordance with another aspect of the invention, the arrangement enables the laminate film 104 to be steadily unwound from the roll 102 as the film feeds into the laminator 100.

Figure 2:
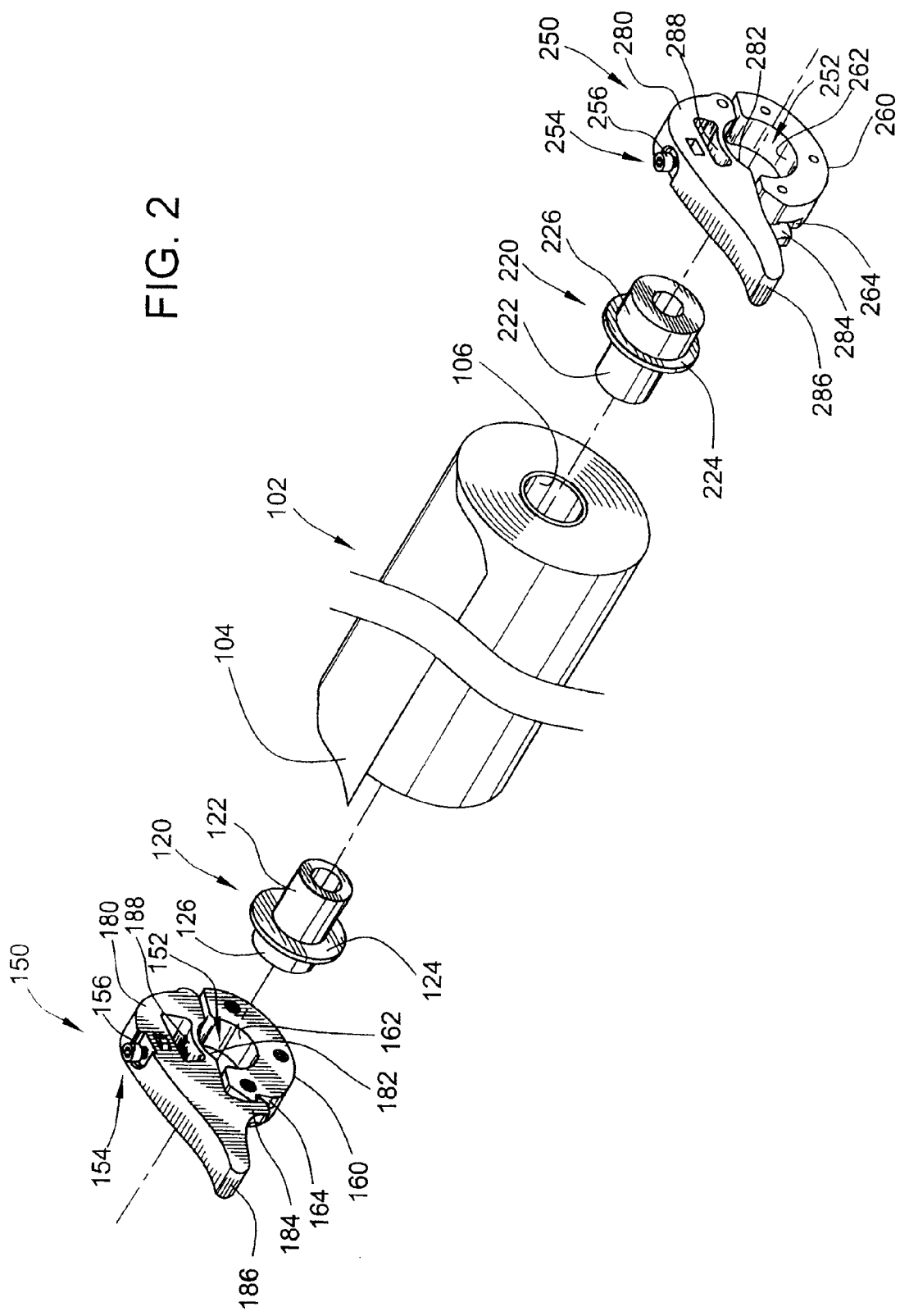
FIG. 2 is an exploded view of the film loading arrangement shown in FIG. 1.

In order to enable the film roll 102 to be loaded in the laminator 100 in only one relative position, the film roll 102 and the laminator 100 include mating structures that differ from one side to the other. More specifically, in the illustrated embodiment shown in FIG. 2, the film roll 102 includes a first male coupling structure 120 at one end, and a second male coupling structure 220 at the other. The first and second male coupling structures 120, 220 may be formed by the ends of the tube 106 itself, or by an alternate structure, such as an insert (as depicted in FIG. 2). The laminate film mounting areas (such as 110, 112 in FIG. 1) of the laminator 100 include corresponding first and second female support units 150, 250 coupled to interior facing surfaces 114 and 214, respectively, of the laminator 100 for receipt of the corresponding first and second male coupling structures 120, 220 coupled to the film roll 102

To ensure that the film roll 102 is properly loaded in the laminator 100, the film roll 102 is preferably supplied to the user with at least one of the male coupling structures 120, 220 extending from the proper end of the film roll 102. For example, at least one of the male coupling structures 120, 220 is preferably formed as part of the tube 106 or is substantially fixed to the tube 106 (including, but not limited to, gluing the male coupling structure 120, 220 to the tube 106) such that the user could not inadvertently remove and improperly replace the male coupling structure 120, 220. It will be appreciated, however, that one or both of the male coupling structures 120, 220 may be in the form of a removable insert that may be placed within a film roll 102 prior to use. If the male coupling structures 120, 220 are a separate component from the tube 106, then the tube 106 or laminate film roll 102 may have a feature or marking that clearly indicates the end of the tube to which the respective male coupling structures 120, 220 should be coupled.

To minimize feeding difficulties resulting from skew in the film 104, the male coupling structures 120, 220 preferably comprise a structure to maintain the film roll 102 in a set lateral position within the machine 100. As shown in FIG. 2, the male coupling structures 120, 220 may comprise an insertion portion 122, 222 for disposal within the hollow interior of the film roll 102, and a protruding male support portion 126, 226 for receipt within the respective female support unit 150, 250. The male coupling structure 120, 220 may further comprise a lateral restrictor, such as a radially extending flange 124, 224, to limit the lateral movement of the film roll 102 within the laminator 100 and restrict the extent that the insertion portion 122, 222 may enter the tube 106. When the insertion portion 122, 222 is fully inserted into the tube 106 such that the radially extending flange 124, 224 is adjacent to the laminate film roll 102, the roll 102 may be disposed in a precise position within the laminator 100 and with respect to any additional roll 102. As described in more detail below, the support portions 126, 226 are coupled to the respective female support units 150, 250 when the roll of film 102 is loaded in the laminator 100.

When laminating sheet materials with different widths on a single laminator 100, it may be desirable for the loading arrangement of the laminator 100 to have the capability to accommodate a plurality of sizes of laminate film rolls. Accordingly, the male coupling structures 120, 220 may be any suitable length to permit laminate film rolls having varying sizes to be mounted to the laminator 100.

Turning to FIGS. 3 and 4, a laminate film roll 102a is shown in FIG. 3 that is larger in width than the laminate film roll 102b shown in FIG. 4. When film rolls 102b having smaller widths are loaded into the laminator 100, the first male coupling structure 120b and the second male coupling structure 220b may extend further from the roll 102b (as shown in FIG. 4) than first and second male coupling structures 120a, 220a for use with larger film rolls 102a (as shown in FIG. 3).

In FIG. 3, the first and second male coupling structures 120a, 220a may extend from the laminate roll 102a substantially equal distances $M_a$. The width of the roll $R_a$ in combination with the two distances $M_a$ equal a total width W for the laminate film roll 102a coupled to the first and second male coupling structures 120a, 220a. When the width $R_b$ of the laminate roll 102b is smaller, as shown in FIG. 4, the length $M_b$ that each male coupling structure 120b, 220b extends from the laminate roll 102b may be larger than the length $M_a$ such that the total width W of the laminate film roll 102b combined with the first and second male coupling structures 120b, 220b remains sufficient to span the distance between the first and second female support units 150, 250 to mount the laminate film roll 102.

Referring to FIGS. 2-4, although the length of the support portions 126, 226 are depicted longer than the radially extending flanges 124, 224, each of the support portions 126, 226 and the radially extending flanges 124, 224, individually and/or in combination, may be any suitable length (e.g., the length of the radially extending flange 124, 224 may be larger than the length of the support portion 126, 226) such that they permit the laminate film roll 102 to be loaded into the laminator 100. It will be appreciated by those of skill in the art that the first and second male coupling structures 120, 220 may be of any appropriate geometry so long as they adequately support the film roll 102 within the laminator 100. For example, the coupling structures 120, 220 may not include a flange 124, 224, but may be secured to the roll of film 102 with the support portions 126, 226 protruding from the roll of film 102 a length sufficient to engage the female support structures 150, 250. In any event, however, at least the respective portions of the support portions 126, 226 that engage the female support structures 150, 250 preferably present respectively different diameters such that the roll of film 102 may be loaded into the laminator 100 in only one direction or orientation.

Turning now to the support of the roll 102 and male coupling structures 120, 220 within the machine 100, the female support units 150, 250 are respectively disposed on opposing interior facing surfaces 114, 214 (or suitable support portions of or coupled to the laminator to present opposing faces) of the laminator 100. Any appropriate structure may be provided to couple the first and second female support units 150, 250 to the laminator 100. The female support units 150, 250 have a structure suitable to receive the support portion 126, 226 of the respective male coupling structures 120, 220, secure the roll 102 to the laminator 100, and permit the support portions 126, 226 to rotate within the female support units 150, 250.

Figure 5:
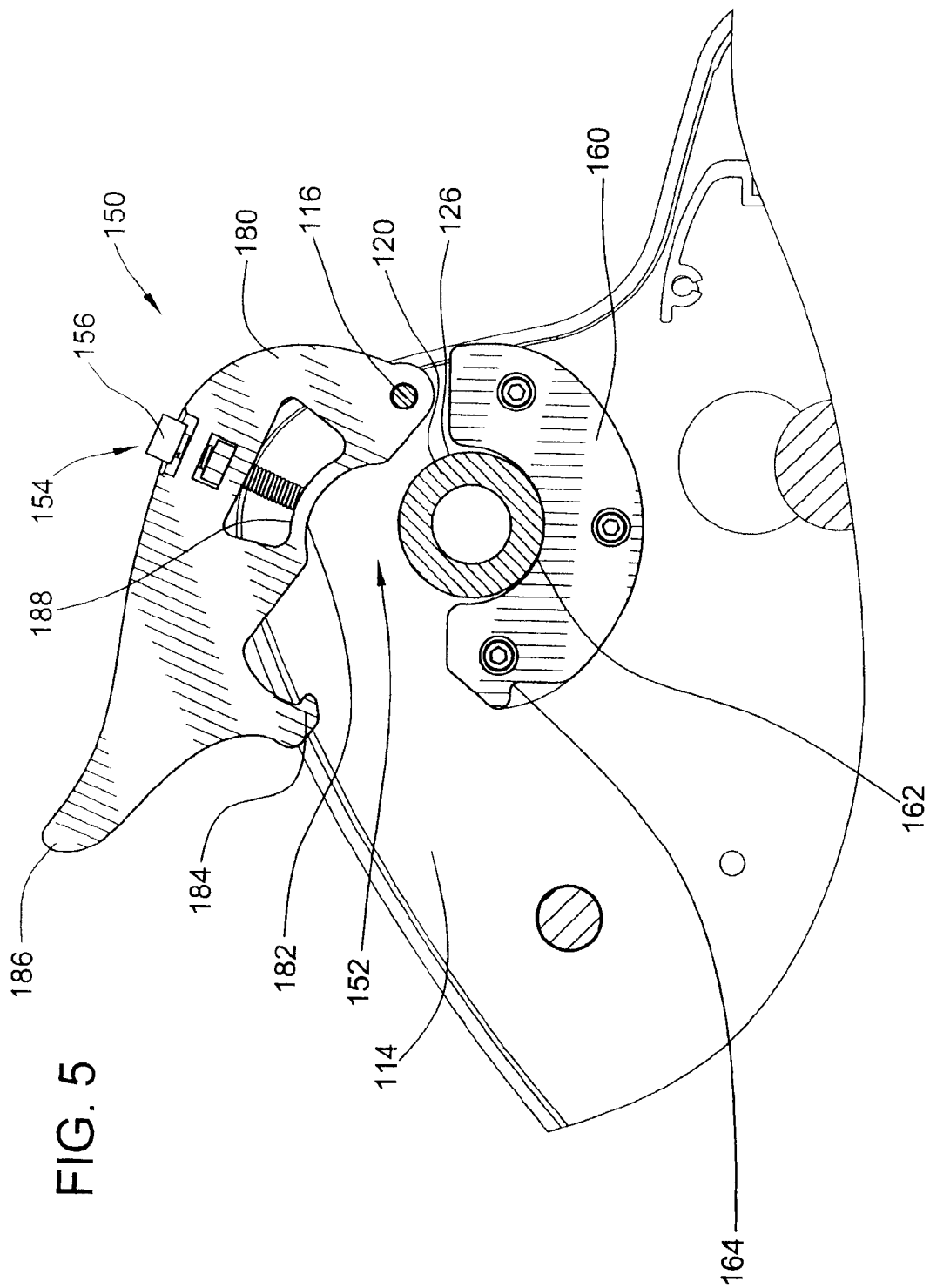
FIG. 5 is a fragmentary cross-sectional view of the laminating machine and film loading arrangement shown in FIG. 1, the film loading arrangement being in an open position.
Figure 6:
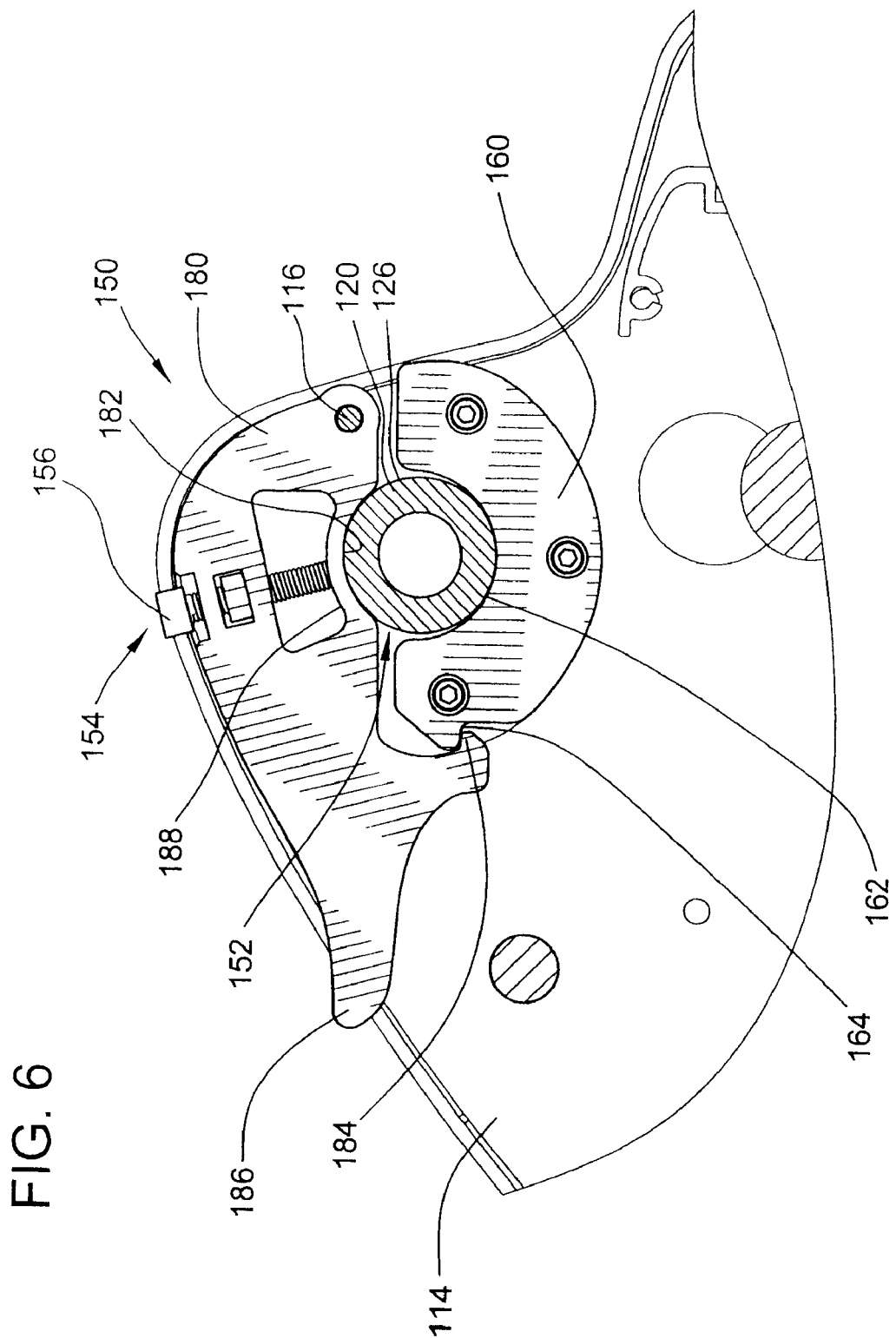
FIG. 6 is another fragmentary cross-sectional view of the laminating machine and film loading arrangement shown in FIG. 1, the film loading arrangement being in a closed position.

As shown in FIGS. 2, 5, and 6, the female support unit 150, 250 comprises a lower support structure 160, 260 for supporting the male coupling structures 120, 220, and an upper securing structure 180, 280 for retaining the male coupling structure 120, 220 within the support unit 150, 250 once the roll of film 102 has been properly loaded. The lower support structure 160, 260 comprises a seat 162, 262 that preferably presents a generally arcuate shape. The generally arcuate shape of the seat 162, 262 accommodates the cylindrical outer surface of the support portion 126, 226 of the male coupling structure 120, 220.

The upper securing structure 180, 280 generally is coupled to the lower support structure 160, 260 to secure the laminate film roll 102 to the laminator 100. The upper securing structure 180, 280 may comprise a contact portion 182, 282 for disposal adjacent to the support portion 126, 226 of the male coupling structure 120, 220 when the laminate film roll 102 is mounted to the laminator 100. The contact portion 182, 282 may present a generally arcuate shape to conform at least partially with the cylindrical external surface of the support portion 126, 226. The combination of the seat 162, 262 and the contact portion 182, 282 presents a cradle 152, 252 that retains the male coupling structure 120, 220 within the female support unit 150, 250.

In order to ensure proper loading of a laminate film roll 102 into a laminator 100, the diameter of the cradle 152 for the first female support unit 150 is preferably different from the diameter of the cradle 252 for the second female support unit 250. In this way, the cradle 152 for the first female support unit 150 and the cradle 252 for the second female support unit 250 each properly accommodate a respective one of the different diameters and $D_2$ of the first and second male coupling structures 120, 220 such that the roll of film 102 may be loaded in only the desired, correct orientation relative to the laminator 100. While the illustrated embodiment utilizes different diameters $D_1$ and $D_2$ of the first and second male coupling structures 120, 220, those skilled in the art will understand that other structural and geometrical configurations can be incorporated to provide the difference between ends of the tube 106 and/or the first and second male coupling structures 120, 220.

If a user inadvertently attempts to place the laminate film roll 102 in the improper orientation in the laminator 100, then the first and second female support units 150, 250 are unable to receive and properly conform around at least one of the first and second male coupling structures 120, 220 (e.g., the cradle of one of the female support units will be too small to conform around one of the male coupling structures, and the cradle of the other female support unit will be too large to properly conform around the other male coupling structure). Thus, the user will be able to immediately discern that the laminate roll 102 is in the improper orientation, and, subsequently, properly reorient the roll 102. In this way, the user is prevented from improperly loading a laminate film roll 102 into a laminator 100.

The female support unit 150, 250 may further comprise a structure to securely retain the male coupling structure 120, 220 when the laminate film roll 102 is loaded in the laminator 100, while also permitting the relatively swift and simple removal of the laminate film roll 102 from the laminator 100. For example, the upper securing structure 180, 280 of the female support unit 150, 250 may releasably attach to the lower support structure 160, 260 such that the laminate film roll 102 may be secured to the laminator 100 when loaded. To accomplish such releasable attachment, the upper securing structure 180, 280 may comprise a generally hook-shaped latch or latching structure 184, 284 that may be received by a latch receiving portion 164, 264 on the lower support structure 160, 260 to secure the upper securing structure 180, 280 to the lower support structure 160, 260. It will be appreciated, however, that any suitable releasable structure may be utilized to secure the laminate roll 102 to the laminator 100.

The opposite end of the upper securing structure 180, 280 may likewise be coupled to the lower support structure 160, 260. For example, upper securing structure 180, 280 may have a similar latching structure at the opposite end. Alternately, the upper securing structure 180, 280 may be pivotably coupled to the lower support structure 160, 260 either directly or indirectly. As shown in FIG. 5, for example, the upper securing structure 180, 280 may be pivotably coupled to the interior surface 114, 214 of the laminator 100 by way of a pivot protrusion (such as 116). Alternately, the upper securing structure 180, 280 may be pivotably coupled to the lower support structure 160, 260.

To facilitate the movement of the upper securing structure 180, 280, the upper securing structure 180, 280 may include an elongated handle 186, 286 that can be used to pivot the upper securing structure 180, 280 and engage the latching structure 184, 284 with the latch receiving portion 164, 264 as shown in FIG. 6. The handle 186, 286 may similarly be used to release the latching structure 184, 284 from the latch receiving portion 164, 264. A force may be applied to the handle 186, 286 to elastically deform the upper securing structure 180, 280 a sufficient distance to disengage the latching structure 184, 284 from the latch receiving portion 164, 264. When disengaged, the upper securing structure 180, 280 may be pivoted away from the lower support structure 160, 260 to permit the unloading of the laminate film roll 102 from the laminator 100. The second female support unit 250 on interior surface 214 operates in a substantially similar or identical manner.

It is desirable for the laminate film roll 102 to be restricted by a certain amount of force (such as a friction force) to prevent over-rolling as the laminate film 104 is pulled into the laminator 100. Over-rolling may occur, for example, when the laminator 100 is pulling the film 104 if the pulling force is not steady or when the laminator 100 stops pulling the film 104 and the momentum of the roll 102 causes it to continue to rotate. If a sufficient resisting force is not applied to the roll 102, then the momentum of the roll 102 may undesirably result in excess unwound film 104 and a lack of tension between the laminate roll 102 and the laminator 100. This over-rolling and/or lack of tension can cause fluctuations in the feed rate of the laminate film 104 into the laminator 100 and cause fluctuations in the quality of the laminated sheet material.

In order to provide a desirable tensioning of the film 104 as it is unrolled from the roll 102, the female support unit 150, 250 may further comprise a tensioning arrangement that allows the female support unit 150, 250 to be adjusted to increase and decrease the force required to rotate the laminate film roll 102. While such a tensioning arrangement is illustrated with each female support unit 150, 250, i.e., at both ends of both rolls of film, it will be appreciated that a lesser number of tensioning arrangements may be utilized so long as a respective single tensioning arrangement is provided for each roll of film 102. In accordance with teachings of the invention, the female support unit 150, 250 may comprise a friction force adjustment mechanism 154, 254. The friction force adjustment mechanism 154, 254 allows the user to adjust the size of the cradle 152, 252 in which the male coupling structures 120, 220 are received, thereby adjusting the amount of friction between the male coupling structures 120, 220 and the female support units 150, 250.

As shown in FIG. 7, the friction force adjustment mechanism 154, 254 comprises a screw 156, 256 that extends through a portion of the upper securing structure 180, 280. As shown in FIGS. 5 and 6, the screw 156, 256 may be lowered from a position shown in FIG. 7 into contact with an upper surface 188, 288 of the contact portion 182, 282 by rotating the screw 156, 256. When the screw 156, 256 is further rotated, it deforms the contact portion 182, 282 such that the diameter of the cradle 152, 252 decreases in at least one direction to create a compression and friction force on the support portion 126, 226 of the male coupling structure 120, 220 supported therein. As the screw 156, 256 continues to be tightened, the compressive force applied to the support portion 126, 226 of the male coupling structure 120, 220 increases.

During the lamination process, the laminate film roll 102 is forcibly rotated (i.e., the male coupling structures 120, 220 rotate within the cradle 152, 252 of the female support units 150, 250) to create a tension in the film 104 as the film 104 is pulled into the laminator 100. In order for the laminate film roll 102 to rotate, the force applied must be sufficient to overcome the friction force created by the compression of contact portion 182, 282 against the support portion 126, 226 of the male coupling structures 120, 220. Thus, the greater deformation of the contact portion 182, 282, the greater the compression on the male coupling structures 120, 220, and the greater the tension in the film during unwinding. In this way, the friction force adjustment mechanism 154, 254 prevents over-rolling of the film 104 and enables tension to be maintained in the film 104 between the laminator 100 and the roll 102 that can help to prevent quality fluctuations in a laminated sheet.

Figure 8B:
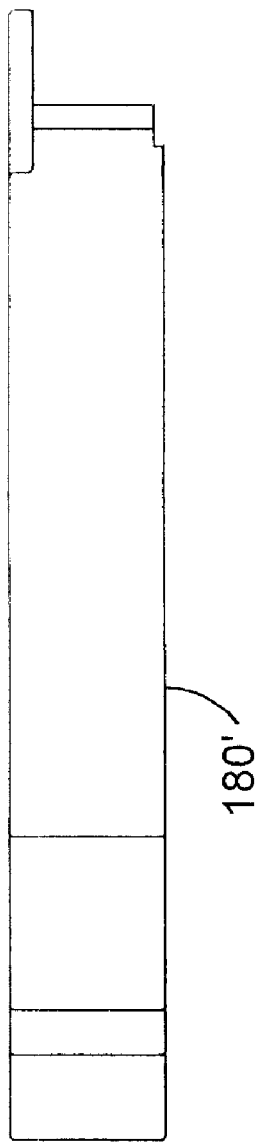
Figure 8A:
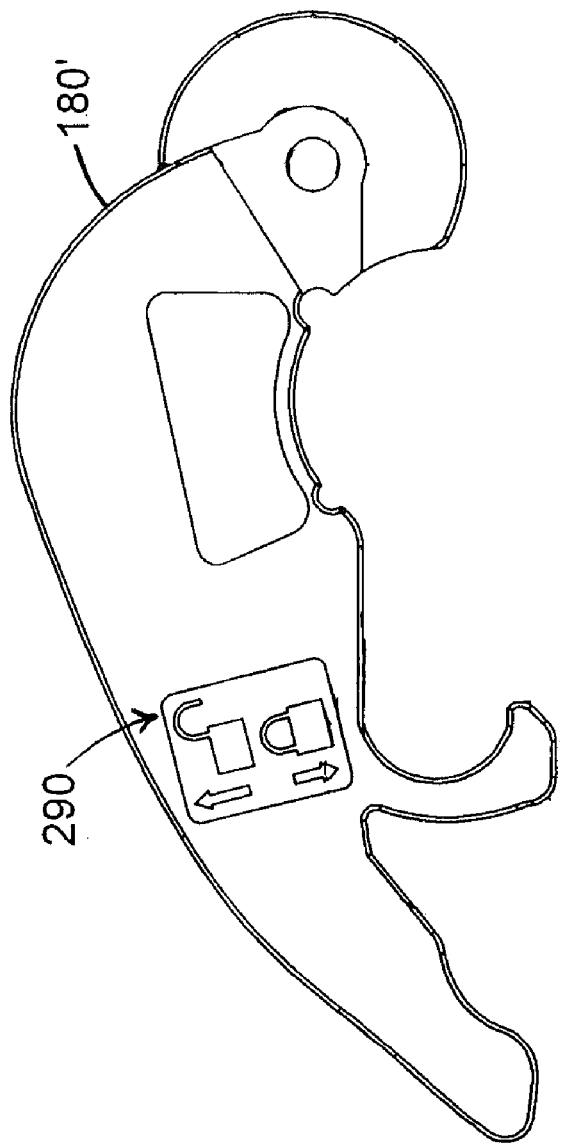
FIG. 8a is a side view illustrating an upper securing structure of the film loading arrangement that is a second embodiment of the invention.
Figure 9A:
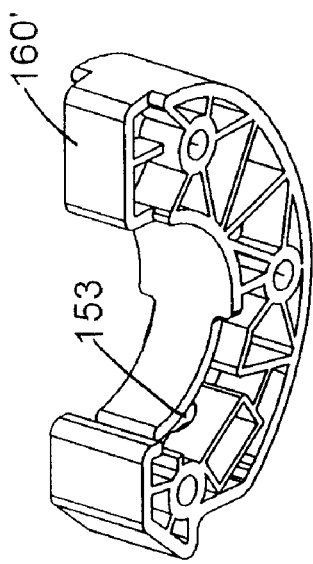
FIG. 9a is a perspective view illustrating a lower support structure of the film loading arrangement that is a second embodiment of the invention.
Figure 9C:
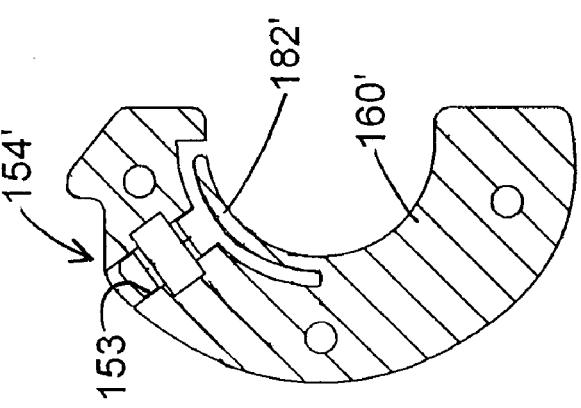
FIG. 9c is a section view taken along line 9c-9c of FIG. 9b.
Figure 9B:
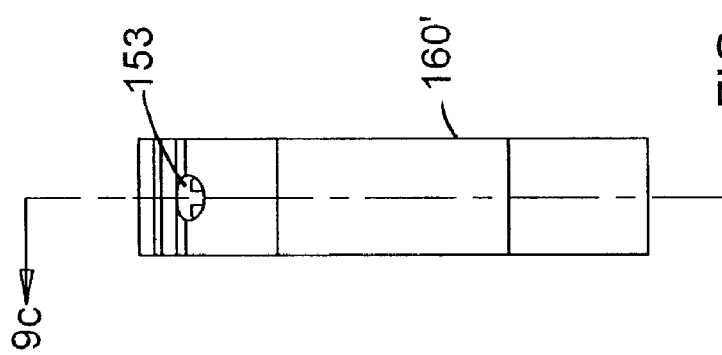

The screw 156, 256 is preferably adjusted to apply a desired friction force on the support portion 126, 226 prior to the user obtaining the laminator 100 such that no adjustment is necessary by the user. The friction force adjustment mechanism 154, 264, however, may permit the friction force to be adjusted when desired and/or to compensate for any decrease in friction force due to the loosening of the screw 156, 256 over time. While the friction force adjustment mechanism 154, 254 has been illustrated as disposed in the upper securing structure 180, 280, it will be appreciated that the mechanism 154, 254 may alternately be disposed in the lower support structure 160, 260 or other structure so long as the mechanism presents an adjustable surface that forms a portion of a cradle 152, 262 supporting a male coupling 120, 220. FIGS. 8a-b and 9a-c illustrate one such embodiment in which the mechanism 154' is disposed in the lower support structure 160' and is absent from the upper securing structure 180'. Specifically, as shown in FIGS. 8a and 8b, there is no screw or adjusting mechanism present in the upper securing structure 180' to adjust the friction force. Instead, as shown in FIGS. 9a-c, the lower support structure 160' includes an aperture 153 for receiving the screw 156 (not shown in FIGS. 9b and 9c for clarity). Operation of the screw 156 in the lower support structure 160' to deform the contact portion 182' and adjust the tension is substantially the same as discussed above. As can be seen in FIGS. 8a and 8b, indicia 290 can be added to the upper securing structure 180' to indicate to a user the locked and unlocked positions of the upper securing structure 180'.

Likewise, while the upper securing structure 180, 280 has been illustrated as a moveable structure, and the lower support structure 160, 260 as a stationary structure, it will be appreciated that the upper securing structure 180, 280 may be a stationary structure and the lower support structure 160, 260 may be a moveable structure. Similarly, for each roll, a female support unit 150, 250 such as disclosed herein may be provided as support at only one end of the roll of film 102, and an appropriately sized opening or bore provided as support at the opposite end of the roll 102.

The following example further illustrates the invention but, of course, should not be construed as in any way limiting its scope. In order to load a laminate film roll 102, the male coupling structures 120, 220 are inserted into designated ends of a laminate film roll 102. As described above, to avoid user error, the roll 102 may preferably be coupled to one or both of the male coupling structures 120, 220 when provided to the user or one or both of the male coupling structures 120, 220 may be formed as part of the laminate film roll 102.

The user loads the laminate film roll 102 into the laminator 100 by placing the first and second male coupling structures 120, 220 into the corresponding seats 162, 262 of the first and second female support units 150, 250. If the first and second male coupling strictures 120, 220 do not properly fit in the orientation that the user attempts to place them, then the roll 102 may be reversed into the proper orientation. When the laminate film roll 102 is resting in the seats 162, 262, the handles 186, 286 may be used to lower the upper securing structures 180, 280 until the latching structures 184, 284 engage the latch receiving portions 164, 264. The laminate film roll 102 is now properly loaded into the laminator 100.

If one or both of the friction force adjustment mechanisms 154, 254 are not pre-set to apply the desired amount of compression force on the respective male coupling structures 120, 220, then screw 156, 256 may be rotated to increase (or decrease) the amount of tension necessary to rotate the roll 102 and unwind the respectively supported film 104. As described above, the screw 156, 256 exerts a force on an upper surface 188, 288 of the contact portion 182, 282 to deform the contact portion 182, 282 such that a desired compression force is applied to the male coupling structures 120, 220.

One of ordinary skill in the art will appreciate that the upper and lower laminate film rolls may be loaded in a substantially similar fashion, as the film loading arrangements or the upper and lower laminate films may be substantially the same or identical to one another. The first and second female support units for the lower laminate film roll, however, may respectively be disposed in a reverse orientation than the respective components for the upper roll. The reverse orientation may be necessary, for example, because for certain laminators the adhesive on the lower roll of film should be facing upward as the film enters the laminator so the film can be adhered to the lower surface of a sheet material, while the adhesive on the upper roll of film should be facing downward as the film enters the laminator to be adhered to the upper surface of a sheet material.

To unload a roll of film, the handles 186, 286 may be used to sufficiently deform the upper securing structures 180, 280 and disengage the latching structures 184, 284 from the latch receiving portions 164, 264. The upper securing structures 180, 280 may then be pivoted upward to permit the laminate film roll 102 to be removed from the seats 162, 262 of the lower support structures 160, 260.

It will be appreciated that the film loading apparatus may be used with rolls of thermal adhesive films or pressure sensitive adhesive films. Additionally, the film loading apparatus may be utilized on laminators capable of receiving one or more rolls of laminate film. A film loading arrangement that prevents improper loading of a laminate film roll into a laminator by utilizing one or more features that allow the laminate film roll to be loaded in only the correct orientation is disclosed herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Various features of the invention are set forth in the following claims.

The invention claimed is:

1. A laminating machine configured to support a roll of laminate film having first and second ends, the laminating machine comprising:
   a support unit configured to support the first end of the roll of laminate film, the support unit including a support structure for supporting the first end and a securing structure pivotable relative to the support structure about a pivot axis to releasably secure the first end to the support structure;
   wherein one of the support structure and the securing structure includes a latch, and wherein the other of the support structure and the securing structure includes a latch receiving portion configured to receive the latch to releasably secure the securing structure relative to the support structure; and
   wherein the securing structure further includes a handle portion spaced from the pivot axis such that the one of the latch and the latch receiving portion on the securing structure is positioned intermediate the pivot axis and the handle portion, the handle portion facilitating movement of the securing structure relative to the support structure and facilitating latching and unlatching the securing structure to the support structure, the handle portion configured to deform the securing structure upon application of force to the handle portion to enable unlatching the securing structure from the support structure.

2. The laminating machine of claim 1, wherein the support structure defines an arcuately-shaped seat, wherein the securing structure defines an arcuately-shaped contact portion, and wherein the seat and the contact portion together define a cradle configured to retain the first end within the support unit.

3. The laminating machine of claim 2, wherein the support unit is a first support unit, wherein the cradle defined by the first support unit has a first diameter sized such that the first support unit can receive only the first end of the laminate film roll to properly position the roll in the laminating machine, and wherein the laminator further comprises a second support unit defining a cradle configured to retain the second end of the roll of laminate film, the cradle defined by the second support unit having a second diameter different from the first diameter and sized such that the second support unit can receive only the second end of the laminate film roll to properly position the roll in the laminating machine.

4. The laminating machine of claim 3, wherein the second support unit is substantially the same as the first support unit except for the diameter of the respective cradles.

5. The laminating machine of claim 3, wherein the first support unit is configured to engage a first coupling structure coupled with a tube of the laminate film roll to define the first end of the laminate film roll, and wherein the second support unit is configured to engage a second coupling structure coupled with the tube of the laminate film roll to define the second end of the laminate film roll.

6. The laminating machine of claim 5, wherein the first coupling structure has a portion with a first diameter sized to be properly received only in the cradle of the first support unit, and wherein the second coupling structure has a portion with a second diameter sized to be properly received only in the cradle of the second support unit.

7. The laminating machine of claim 5, wherein the first and second support units are spaced apart by a fixed distance, and wherein the first and second coupling structures can vary in length to accommodate laminate film of different widths.

8. The laminating machine of claim 2, wherein the support unit further includes a friction force adjustment mechanism for adjusting a friction force exerted on the roll of laminate film.

9. The laminating machine of claim 8, wherein the friction force adjustment mechanism includes a screw operable to selectively deform at least one of the seat and the contact portion to change a diameter of the cradle in at least one direction.

10. The laminating machine of claim 9, wherein the screw is supported in the support structure and selectively engages and deforms the seat to change the diameter of the cradle.

11. The laminating machine of claim 1, wherein the latch is on the securing structure and the latch receiving portion is on the support structure.

12. A laminating machine configured to support a roll of laminate film having first and second ends, the laminating machine comprising:

a first support unit configured to support the first end of the roll of laminate film, the first support unit including a first support structure having an arcuately-shaped seat for supporting the first end, and a first securing structure having an arcuately-shaped contact portion and being pivotable relative to the first support structure about a first pivot axis to releasably secure the first end to the first support structure in a first cradle defined by the seat and the contact portion of the first support unit, the first securing structure further including a first handle portion; and a second support unit configured to support the second end of the roll of laminate film, the second support unit including a second support structure having an arcuately-shaped seat for supporting the second end, and a second securing structure having an arcuately-shaped contact portion and being pivotable relative to the second support structure of the second support unit about a second pivot axis to releasably secure the second end to the second support structure in a second cradle defined by the seat and the contact portion of the second support unit, the second securing structure further including a second handle portion;

wherein one of the support structure and the securing structure of each support unit includes a latch, and wherein the other of the support structure and the securing structure of each support unit includes a latch receiving portion configured to receive the latch to releasably secure the securing structure relative to the support structure;

wherein the first handle portion is spaced from the first pivot axis such that the one of the latch and the latch receiving portion on the first securing structure is positioned intermediate the first pivot axis and the first handle portion, the first handle portion facilitating movement of the first securing structure relative to the first support structure and facilitating latching and unlatching the first securing structure to the first support structure, the first handle portion configured to deform the first securing structure upon application of force to the first handle portion to enable unlatching the first securing structure from the first support structure; and wherein the second handle portion is spaced from the second pivot axis such that the one of the latch and the latch receiving portion on the second securing structure is positioned intermediate the second pivot axis and the second handle portion, the second handle portion facilitating movement of the second securing structure relative to the second support structure and facilitating latching and unlatching the second securing structure to the second support structure, the second handle portion configured to deform the second securing structure upon application of force to the second handle portion to enable unlatching the second securing structure from the second support structure.

13. The laminating machine of claim 12, wherein the cradle defined by the first support unit has a first diameter, wherein the cradle defined by the second support unit has a second diameter different from the first diameter, wherein the first diameter is sized such that the first support unit can receive only the first end of the laminate film roll to properly position the roll in the laminating machine, and wherein the second diameter is sized such that the second support unit can receive only the second end of the laminate film roll to properly position the roll in the laminating machine.

14. The laminating machine of claim 12, wherein each of the first and second support units includes a friction force adjustment mechanism for adjusting a friction force exerted on the roll of laminate film.

15. The laminating machine of claim 14, wherein each friction force adjustment mechanism includes a screw operable to selectively deform at least one of the seat and the contact portion of the respective support unit to change a diameter of the cradle in at least one direction.

16. The laminating machine of claim 15, wherein the screw of each friction force adjustment mechanism is supported in the respective support structure and selectively engages and deforms the seat to change the diameter of the cradle.

17. The laminating machine of claim 12, wherein the latch is on the securing structure and the latch receiving portion is on the support structure.

18. A laminating machine configured to support a roll of laminate film having first and second ends, the laminating machine comprising:

first and second support units configured to support the respective first and second ends of the roll of laminate film, each support unit including a support structure having an arcuately-shaped seat for supporting the respective first or second end, and a latch receiving portion;

a securing structure having an arcuately-shaped contact portion, a handle portion, a latch, and being pivotable relative to the support structure about a pivot axis such that engagement of the latch with the latch receiving portion releasably secures the respective first or second end of the roll of laminate film to the support structure in a cradle defined by the seat and the contact portion of the respective support unit, wherein the handle portion is spaced from the pivot axis such that the latch is positioned intermediate the pivot axis and the handle portion, the handle portion facilitating movement of the securing structure relative to the support structure and facilitating latching and unlatching the securing structure to the support structure, the handle portion configured to deform the securing structure upon application of force to the handle portion to enable unlatching the securing structure from the support structure; and a friction force adjustment mechanism for adjusting a friction force exerted on the roll of laminate film, the friction force adjustment mechanism including a screw operable to selectively deform at least one of the seat and the contact portion to change a diameter of the cradle in at least one direction;

wherein the cradle defined by the first support unit has a first diameter, wherein the cradle defined by the second support unit has a second diameter different from the first diameter, wherein the first diameter is sized such that the first support unit can receive only the first end of the laminate film roll to properly position the roll in the laminating machine, and wherein the second diameter is sized such that the second support unit can receive only the second end of the laminate film roll to properly position the roll in the laminating machine.

\* \* \* \* \*